(12) United States Patent  
Liu et al.

(10) Patent No.: US 11,799,656 B2  
(45) Date of Patent: Oct. 24, 2023

(54) SECURITY AUTHENTICATION METHOD AND DEVICE

(71) Applicants: China Mobile Communication Co., Ltd Research Institute, Beijing (CN); China Mobile Communications Group Co., Ltd., Beijing (CN)

(72) Inventors: Fuwen Liu, Beijing (CN); Min Zuo, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 712 days.

(21) Appl. No.: 16/632,910

(22) PCT Filed: Jul. 25, 2018

(86) PCT No.: PCT/CN2018/097027  
§ 371 (c)(1),  
(2) Date: Jan. 22, 2020

(87) PCT Pub. No.: WO2019/020051  
PCT Pub. Date: Jan. 31, 2019

(65) Prior Publication Data  
US 2020/0169406 A1    May 28, 2020

(30) Foreign Application Priority Data  
Jul. 28, 2017  (CN) .......................... 201710632863.4

(51) Int. Cl.  
*H04L 9/32*     (2006.01)  
*H04L 9/06*     (2006.01)  
(Continued)

(52) U.S. Cl.  
CPC .......... *H04L 9/3226* (2013.01); *H04L 9/0643* (2013.01); *H04L 9/30* (2013.01); *H04L 9/3247* (2013.01); *H04L 63/083* (2013.01)

(58) Field of Classification Search  
None  
See application file for complete search history.

(56) References Cited

U.S. PATENT DOCUMENTS

| 9,331,856 | B1* | 5/2016 | Song ........................ G06F 21/36 |
| 2010/0191967 | A1* | 7/2010 | Fujii ................... H04L 63/0861 713/169 |
| 2017/0094509 | A1* | 3/2017 | Mistry ..................... H04W 4/50 |

FOREIGN PATENT DOCUMENTS

| CN | 101620705 A | 1/2010 |
| CN | 101674304 A | 3/2010 |

(Continued)

OTHER PUBLICATIONS

Ian Curry, Entrusted Technologies White Paper Version 3 X.509 Certificates, Jul. 1996, pp. 1-7 (Year: 1996).*

(Continued)

*Primary Examiner* — Luu T Pham  
*Assistant Examiner* — Edward X Long  
(74) *Attorney, Agent, or Firm* — Price Heneveld LLP (57) ABSTRACT

A security authentication method and device are provided. The method includes performing, based on a transmitted password authentication message, password authentication with a server and acquiring a result of the password authentication; sending a request authentication message to the server in a case that the result of the password authentication is determined to indicate that the password authentication is successful; performing security authentication through digitally signing by the server all intercommunicated messages and verifying the digital signature by the client, or through encrypting a local random number and all intercommuni- (Continued)

cated messages by the client using a public key and verifying a random number returned by the server.

4 Claims, 4 Drawing Sheets

(51) Int. Cl.
*H04L 9/30* (2006.01)
*H04L 9/40* (2022.01)

(56) References Cited

FOREIGN PATENT DOCUMENTS

| CN | 101764690 A | 6/2010 |
|---|---|---|
| CN | 101958913 A | 1/2011 |
| CN | 101997824 A | 3/2011 |
| CN | 102026195 A | 4/2011 |
| CN | 101674304 B | 7/2013 |
| CN | 104486087 A | 4/2015 |
| CN | 104486343 A | 4/2015 |
| CN | 105592031 A | 5/2016 |
| EP | 2110774 A1 | 10/2009 |

OTHER PUBLICATIONS

Das, A.K., 2011. Analysis and improvement on an efficient biometric-based remote user authentication scheme using smart cards. IET Information Security, 5(3), pp. 145-151. (Year: 2011).*

Renuka, K.M., Kumari, S., Zhao, D. and Li, L., 2019. Design of a secure password-based authentication scheme for M2M networks in IoT enabled cyber-physical systems. IEEE Access, 7, pp. 51014-51027. (Year: 2019).*

* cited by examiner

SECURITY AUTHENTICATION METHOD AND DEVICE

CROSS-REFERENCE TO RELATED APPLICATION

This application is a U.S. national phase application of a PCT Application No. PCT/CN2018/097027 filed on Jul. 25, 2018, which claims priority to a Chinese Patent Application No. 201710632863.4 filed in China on Jul. 28, 2017, the disclosure of which is incorporated herein by reference in its entirety.

TECHNICAL FIELD

The present disclosure relates to a technical field of network security, and in particular, relates to a security authentication method and a security authentication device.

BACKGROUND

With development of Internet technology, network attacks are becoming more and more serious. In a case that a user uses the Internet to conduct communications and transactions, there are problems such as information leakage and malicious tampering of transaction information. Network security of the user has been greatly threatened, which brings great inconvenience to the user.

In the related art, security authentication is usually adopted to ensure communication security. Following two methods are mainly adopted for the security authentication.

A first method is that a client and a server use a shared password as a certificate for the security authentication so as to perform the security authentication through the shared password.

Specifically, in a case that the client receives a response message carrying the password sent by the server, and determines that a local password is the same as the password included in the received response message, authentication at the server is determined to be successful; in a case that the server receives a response message carrying a password sent by the client, and determines that a local password is the same as the password included in the received response message, authentication at the client is determined to be successful.

However, in this method, a problem of leaking the password may happen, for example, an illegal person or entity may illegally acquire the password of the user by using malicious software to breach a system or the like. In a case that the illegal person or entity acquires the password of the user, the illegal person or entity may communicate with the user through the security authentication. Obviously, the communication between the illegal person or entity and the user will bring problems such as privacy divulgence or a financial loss of the user so on, and thus cannot guarantee the communication security of the user.

A second method is to combine Transport Layer Security (TLS) with password authentication to perform security authentication.

Specifically, firstly, the client authenticates the server by using a server certificate, establishes a secure TLS connection with the server, and then the server authenticates the client by using a password on the TLS connection.

However, in this method, it is necessary to completely replace and modify a deployed password authentication system, which wastes existing authentication system resources, increases a usage cost of an authentication system, and is not practical.

SUMMARY

The present disclosure provides a security authentication method and device used to ensure correctness of identities of both communication parties, avoid network attacks such as message leakage and malicious information tampering during communication, and improve reliability of network authentication, ensure communication security of users.

Specific technical solutions provided by the present disclosure are as follow.

In a first aspect, a security authentication method includes performing, based on a transmitted password authentication message, password authentication with a server and acquiring a result of the password authentication; sending a request authentication message to the server in a case that the result of the password authentication is determined to indicate that the password authentication is successful; receiving a response authentication message, returned based on a received request authentication message by the server, including a server certificate and a digital signature value, wherein the server certificate includes a public key of the server, and the digital signature value is acquired based on the request authentication message and the password authentication message; verifying the digital signature value included in the response authentication message based on the public key of the server, to acquire a result of security authentication.

Optionally, sending the request authentication message to the server in a case that the result of the password authentication is determined to indicate that the password authentication is successful, specifically includes: sending the request authentication message to the server in a case that the result of the password authentication is determined to indicate that the password authentication is successful, to trigger the server to perform following steps: performing a hash operation on the password authentication message and the request authentication message to acquire a first hash value, and digitally signing the first hash value based on a local private key to acquire a digital signature value of the request authentication message.

Optionally, verifying the digital signature value included in the response authentication message based on the public key of the server, to acquire the result of the security authentication, includes: performing a hash operation on the password authentication message and the request authentication message to acquire a second hash value; acquiring a verification digital signature value by using a preset digital signature verification algorithm based on the public key and the second hash value; acquiring the result of the security authentication based on a result of comparing the digital signature value with the verification digital signature value.

In a second aspect, a security authentication method includes: receiving a request authentication message sent by a client based on a result of password authentication indicating that password authentication is successful, wherein the result of the password authentication is acquired by performing the password authentication based on a transmitted password authentication message; digitally signing the received request authentication message and the password authentication message based on a local private key to acquire a digital signature value; sending a response authentication message including a local server certificate and the digital signature value to the client, to trigger the client to verify the digital signature value based on a public key of a server included in the server certificate and acquire a result of security authentication.

Optionally, digitally signing the received request authentication message and the password authentication message based on the local private key to acquire the digital signature value, specifically includes: performing a hash operation on the password authentication message and the request authentication message to acquire a first hash value; digitally signing the first hash value based on the private key to acquire a digital signature value of the request authentication message.

Optionally, sending the response authentication message including the local server certificate and the digital signature value to the client, to trigger the client to verify the digital signature value based on the public key of the server included in the server certificate and acquire the result of security authentication, specifically includes: sending the response authentication message including the local server certificate and the digital signature value to the client, to trigger the client perform the following steps: performing a hash operation on the password authentication message and the request authentication message to acquire a second hash value, acquiring a verification digital signature value based on the public key and the second hash value by using a preset digital signature verification algorithm, and acquiring the result of security authentication result based on a result of comparing the digital signature value with the verification digital signature value.

In a third aspect, a security authentication method includes: performing password authentication with a server based on a transmitted password authentication message to acquire a result of the password authentication; sending a request authentication message to the server in a case that the result of the password authentication is determined to indicate that the password authentication is successful, and receiving a response authentication message including a server certificate returned based on the request authentication message by the server, wherein the server certificate includes a public key of the server; encrypting a locally acquired random number, the password authentication message, and the request authentication message based on the received public key of the server to acquire an encrypted value, and sending the encrypted value to the server; receiving a verification random number returned based on the encrypted value by the server, and acquiring a result of security authentication based on a result of comparing the random number with the verification random number, wherein the verification random number is acquired by decrypting the encrypted value using a private key.

Optionally, encrypting the locally acquired random number, the password authentication message, and the request authentication message based on the received public key of the server to acquire the encrypted value, includes: acquiring a locally generated random number in a case that the received response authentication message is determined to include the public key; performing a hash operation on the password authentication message and the request authentication message to acquire a hash value; encrypting the random number and the hash value based on the public key to acquire an encrypted value.

In a fourth aspect, a security authentication method includes receiving a request authentication message sent by a client based on a result of password authentication indicating that the password authentication is successful, wherein the result of the password authentication is acquired by performing the password authentication based on a transmitted password authentication message; sending a response authentication message including a local server certificate to the client based on the request authentication message; receiving an encrypted value sent based on the response authentication message by the client, wherein the encrypted value is acquired by encrypting a locally acquired random number, the password authentication message and the request authentication message based on a public key of a server included in the server certificate; decrypting the encrypted value based on a local private key to acquire an verification random number, sending the verification random number to the client, to trigger the client to acquire a result of security authentication based on a result of comparing the random number with the verification random number.

Optionally, sending the response authentication message including the local server certificate to the client based on the request authentication message, specifically includes: sending the response authentication message including the local server certificate to the client based on the request authentication message, to trigger the client to perform following steps: performing a hash operation on the password authentication message and the request authentication message to acquire a hash value, and encrypting a locally generated random number and the hash value based on the public key to acquire an encrypted value.

In a fifth aspect, a security authentication device includes: an acquisition unit, configured to perform, based on a transmitted password authentication message, password authentication with a server and acquire a result of the password authentication; a sending unit, configured to send a request authentication message to the server in a case that the result of the password authentication is determined to indicate that the password authentication is successful; a reception unit, configured to receive a response authentication message returned based on a received request authentication message by the server and including a server certificate and a digital signature value, wherein the server certificate includes a public key of the server, and the digital signature value is acquired based on the request authentication message and the password authentication message; an authentication unit, configured to verify the digital signature value included in the response authentication message based on the public key of the server, to acquire a result of security authentication.

In a fifth aspect, a security authentication device includes: a reception unit, configured to receive a request authentication message sent by a client based on a result of password authentication indicating that password authentication is successful, wherein the result of the password authentication is acquired by performing the password authentication based on a transmitted password authentication message; a signature unit, configured to digitally sign the received request authentication message and the password authentication message based on a local private key to acquire a digital signature value; a sending unit, configured to send a response authentication message including a local server certificate and the digital signature value to the client, to trigger the client to verify the digital signature value based on a public key of a server included in the server certificate and acquire a result of security authentication.

In a seventh aspect, a security authentication device includes: an acquisition unit, configured to perform password authentication with a server based on a transmitted password authentication message to acquire a result of the password authentication; a request unit, configured to send a request authentication message to the server in a case that the result of the password authentication is determined to indicate that the password authentication is successful, and configured to receive a response authentication message including a server certificate returned based on the request authentication message by the server, wherein the server certificate includes a public key of the server; an encryption unit, configured to encrypt a locally acquired random number, the password authentication message, and the request authentication message based on the received public key of the server to acquire an encrypted value, and configured to send the encrypted value to the server; an authentication unit configured to receive a verification random number returned based on the encrypted value by the server, and acquire a result of security authentication based on a result of comparing the random number with the verification random number, wherein the verification random number is acquired by decrypting the encrypted value using a private key.

In an eighth aspect, a security authentication device includes: a first reception unit, configured to receive a request authentication message sent by a client based on a result of password authentication indicating that the password authentication is successful, wherein the result of the password authentication is acquired by performing the password authentication based on a transmitted password authentication message; a sending unit, configured to send a response authentication message including a local server certificate to the client based on the request authentication message; a second reception unit, configured to receive an encrypted value sent based on the response authentication message by the client, wherein the encrypted value is acquired by encrypting a locally acquired random number, the password authentication message and the request authentication message based on a public key of a server included in the server certificate; an authentication unit, configured to decrypt the encrypted value based on a local private key to acquire an verification random number, and configured to send the verification random number to the client, to trigger the client to acquire a result of security authentication based on a result of comparing the random number with the verification random number.

In a ninth aspect, an electronic device includes: one or more processors, and one or more computer readable media having stored a program for security authentication thereon, wherein when the program is executed by the one or more processors, the one or more processors implement the steps of the method according to any one of the first aspect.

In a tenth aspect, one or more computer readable media includes: a program for security authentication stored on the one or more readable media, wherein when the program is executed by one or more processors, the one or more processors cause a communication device to perform the method according to any one of the first aspect.

In an eleventh aspect, an electronic device includes: one or more processors, and one or more computer readable media having stored a program for security authentication thereon, wherein when the program is executed by the one or more processors, the one or more processors implement the steps of the method according to any one of the second aspect.

In a twelfth aspect, one or more computer readable media include: a program for security authentication stored on the one or more readable media, wherein when the program is executed by one or more processors, the one or more processors cause a communication device to perform the method according to any one of the second aspect.

In a thirteenth aspect, an electronic device includes: one or more processors, and one or more computer readable media having stored a program for security authentication thereon, wherein when the program is executed by the one or more processors, the one or more processors implement the steps of the method according to any one of the third aspect.

In a fourteenth aspect, one or more computer readable media include: a program for security authentication stored on the one or more readable media, wherein when the program is executed by one or more processors, the one or more processors cause a communication device to perform the method according to any one of the third aspect.

In a fifteenth aspect, an electronic device includes: one or more processors, and one or more computer readable media having stored a program for security authentication thereon, wherein when the program is executed by the one or more processors, the one or more processors implement the steps of the method according to any one of the fourth aspect.

In a sixteenth aspect, one or more computer readable media include: a program for security authentication stored on the one or more readable media, wherein when the program is executed by one or more processors, the one or more processors cause a communication device to perform the method according to any one of the fourth aspect.

In the present disclosure, password authentication is performed with a server, and then through digitally signing all intercommunicated messages by the server and performing a digital signature verification by the client, or through encrypting a local random number and all intercommunicated messages by the client using a public key and verifying a random number returned by the server, security authentication is performed, so that by combining the password authentication with a digital signature, or by combining the password authentication with an encryption using a public key, correctness of identities of both communication parties may be ensured, a network attack such as a message leakage and malicious information tampering in a communication process may be avoided, reliability of network authentication is increased, and communication security of users are guaranteed.

DETAILED DESCRIPTION

Technical solutions in some embodiments of the present disclosure will be clearly and completely described in conjunction with the accompanying drawings in some embodiments of the present disclosure hereinafter. It will be apparent that the described embodiments are only a part, rather than all, of the embodiments of the present disclosure. All other embodiments acquired by those of ordinary skills in the art based on some embodiments of the present disclosure without paying creative work are within the scope of the present disclosure.

In order to ensure correctness of identities of both communication parties, avoid network attacks such as message leakage and malicious information tampering during communication, improve reliability of network authentication, and guarantee communication security for users, some embodiments of the present disclosure design a security authentication method. The method is to perform the security authentication by combining a password with a digital signature, or to perform the security authentication by encrypting the password with a public key.

Some embodiments of the present disclosure are illustrated below in conjunction with the accompanying drawings. It should be understood that optional embodiments described herein are merely illustrative and explanatory of the present disclosure, are not intended to limit the present disclosure. The embodiments of the present disclosure and features in the embodiments may be combined with each other without causing conflict among them.

In some embodiments of the present disclosure, two methods are adopted to perform security authentication. A first method is a method of combining a password and a digital signature to perform the security authentication, and a second method is a method of combining a password and a public key encryption Mode to perform the security authentication.

Figure 1:
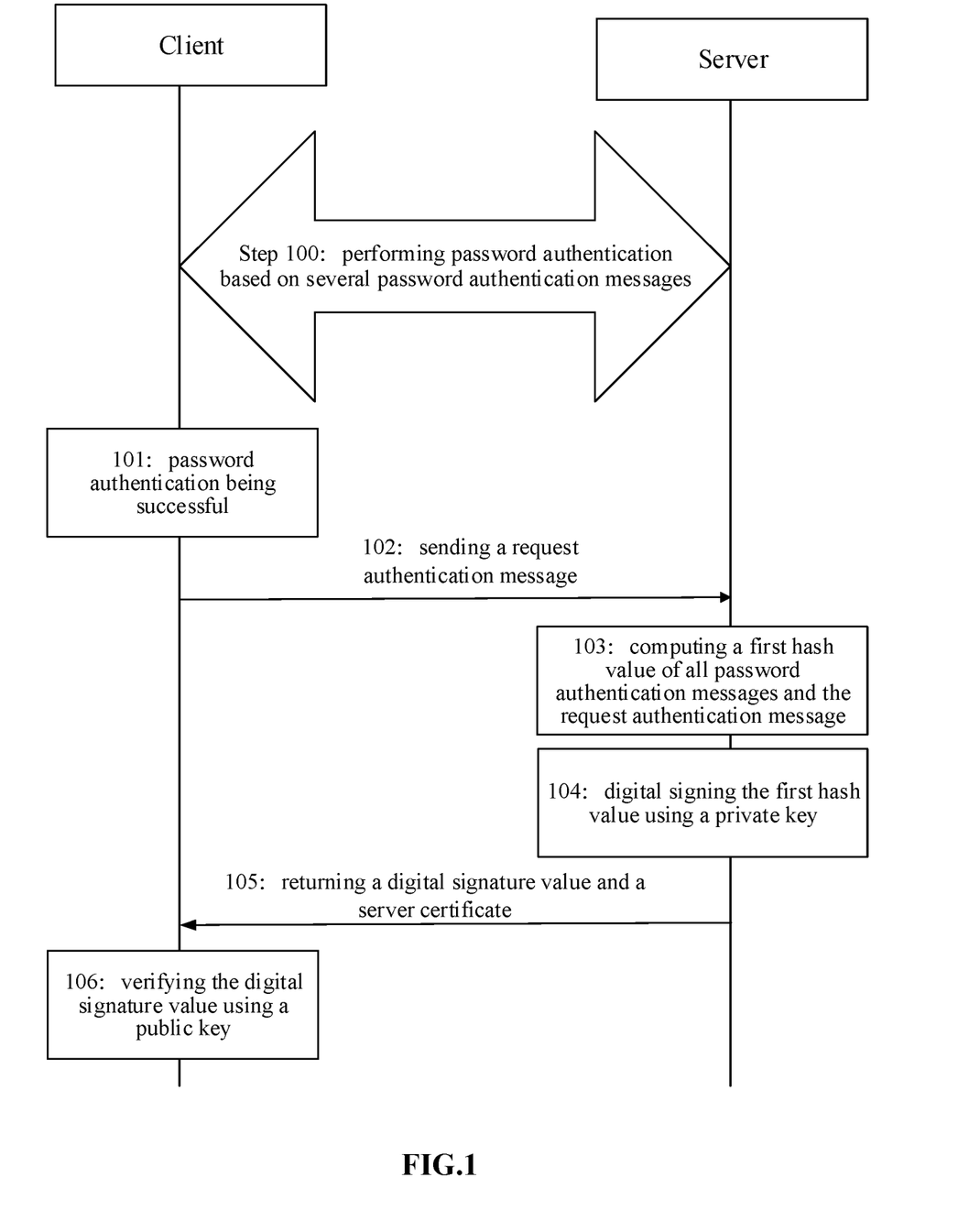
FIG. 1 is a flow chart of a security authentication method in some embodiments of the present disclosure.

Referring to FIG. 1, FIG. 1 is a flowchart of the first method in some embodiments of the present disclosure. In some embodiments of the present disclosure, a combination of a password and a digital signature is adopted, and a specific flow of the security authentication is as follows:

Step 100: performing, by a client based on a transmitted password authentication message, password authentication with a server and acquiring a result of the password authentication.

Specifically, when performing the step 100, the password authentication message includes a designated password. The client and the server perform the password authentication through a shared designated password between the client and the server.

In practical application, the server and the client perform authentication between the server and the client through several password authentication messages, and acquire the result of the password authentication.

The number of the password authentication messages is related to a password protocol being applied, and may be adjusted according to an actual application scenario.

Step 101: in a case that the client determines that passwords of the client and the server are consistent based on the result of the password authentication, determining, by the client, that the password authentication is successful.

In this way, the client and the server preliminarily confirms the authentication is successful after the password authentication. In a subsequent process, an authentication may be performed again by using a digital signature.

Step 102: sending a request authentication message to the server by the client.

Step 103: performing, by the server, a hash operation on all of the password authentication messages and the received request authentication message to acquire a first hash value.

Specifically, firstly, the server acquires all messages intercommunicated between the client and the server, that is, the request authentication message and all of the password authentication messages.

Then, the server performs a hash operation on all of the acquired messages to acquire a first hash value.

In this way, all of the messages intercommunicated between the client and the server may be bound to acquire the corresponding hash value. Here, since the hash value acquired each time is determined based on all of the messages intercommunicated with each other, the hash value varies in real time with a variation of the messages intercommunicated with each other, which may prevent an illegal person or entity from performing an replay attack through continuous transmission of a valid message previously transmitted.

Step 104: digitally signing the first hash value by the server based on a local private key, so as to acquire a digital signature value.

Step 105: sending the digital signature value and a server certificate to the client by the server.

Specifically, when performing the step 105, the server certificate sent by the server includes a public key of the server which may be used to digitally sign or encrypt data.

The server certificate is issued by a trusted authority authentication center of a third party, and relies on a Public Key Infrastructure (PKI) technology to bind a public key of a user and other identification information of the user (such as a name, an E-mail, an ID number, etc.) together to digitally sign or encrypt data with a public key, so as to improve network security.

The PKI is a universal security infrastructure, which is realized by using an asymmetric cryptographic algorithm principle and technology and provides a security service, and the PKI is a basic platform that conforms a standard and provides a complete set of security for performance of on-line e-commerce and e-government by using a public key encryption technology. A PKI-based technology is an infrastructure which provides network information security services based on a public key theory and a technology. A PKI management platform may provide essential key and certificate management for all users who need cryptographic services such as encryption and digital signature. A user may use the security services provided by the PKI platform for secure communication.

Step 106: verifying, by the client based on the public key included in the received server certificate, the received digital signature value to acquire a result of the security authentication.

Specifically, firstly, the client receives the server certificate and the digital signature value sent by the server.

Then, the client acquires all of the password authentication messages intercommunicated with the server, and performs a hash operation on the request authentication message and all of the password authentication messages to acquire a second hash value.

Then, the client inputs the public key and the second hash value into a digital signature verification algorithm to acquire a verification digital signature value.

Finally, the client acquires the result of security authentication based on a result of comparing the digital signature value with the verification digital signature value. In a case that the client determines that the digital signature value is the same as the verification digital signature value, it may be determined that the security authentication is successful; in a case that the client determines that the digital signature value is different from the verification digital signature value, the security authentication fails.

In this way, by combining the password with the digital signature, a preliminary authentication may be performed between the client and the server by using the password, and then an authentication is performed again by using the digital signature, thereby ensuring the correctness of the identities of both communication sides. Thus, information leakage and information tampering in a communication process may be avoided, and network security is improved.

Figure 2:
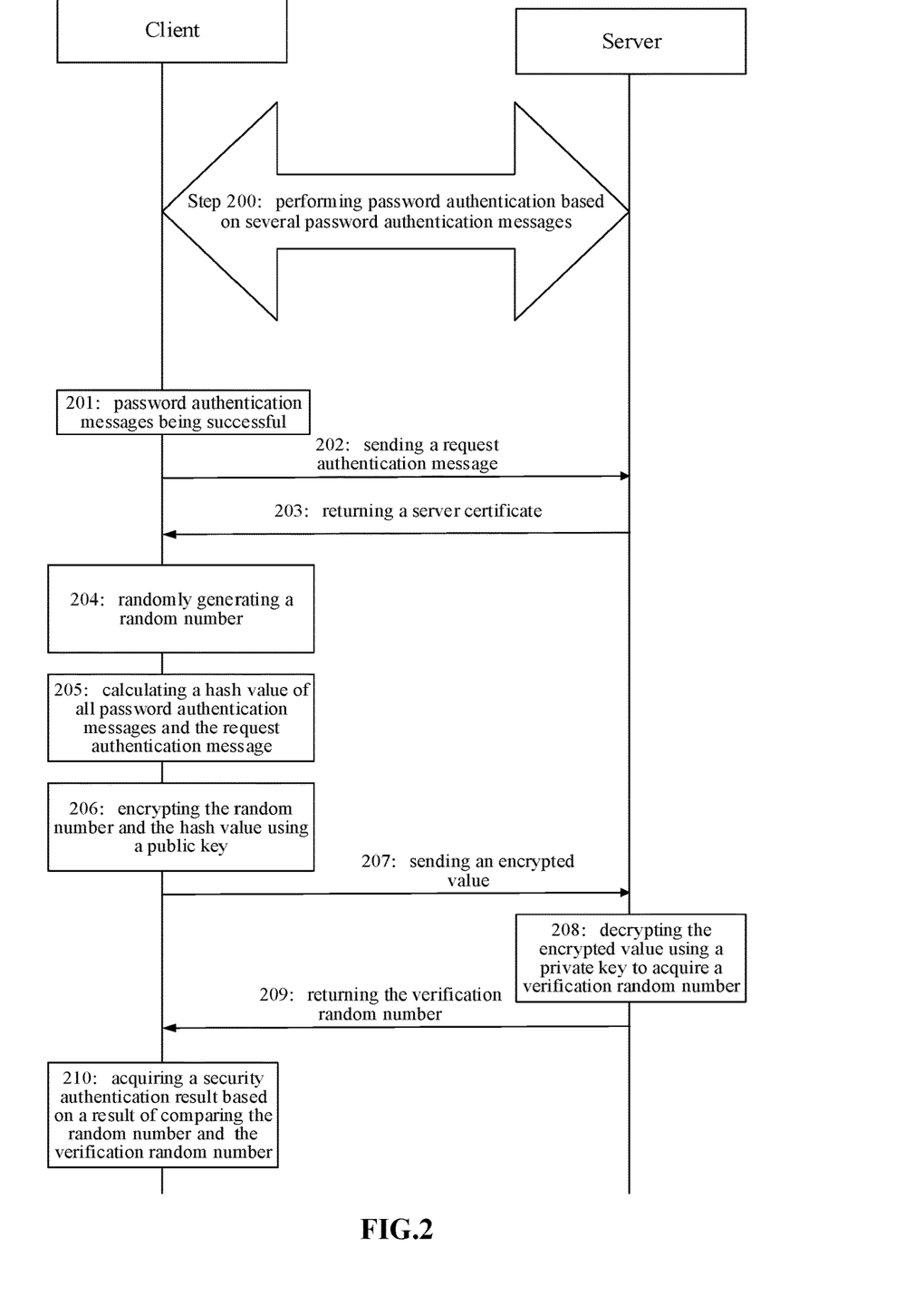
FIG. 2 is a flow chart of a security authentication method according to some embodiments of the present disclosure.

Referring to FIG. 2, FIG. 2 is a flowchart of a second method in some embodiments of the present disclosure. In some embodiments of the present disclosure, a password and a public key encryption are combined, and a specific flow of security authentication is as follows.

Step 200: performing, by the client, a password authentication with a server based on a transmitted password authentication message, and acquiring a result of the password authentication.

Specifically, when performing the step 200, a designated password is included in the password authentication message. The client and the server perform the password authentication through the shared designated password between the client and the server.

In practical application, the server and the client perform authentication between the server and the client through several password authentication messages, and acquire the result of the password authentication.

The number of the password authentication messages is related to a password protocol being applied, and may be adjusted according to an actual application scenario.

Step 201: in a case that the client determines that passwords of the client and the server are consistent based on the result of the password authentication, determining, by the client, that the password authentication is successful.

In this way, the client and the server preliminarily confirms the authentication is successful after the password authentication. In a subsequent process, an authentication may be performed again by using a digital signature.

Step 202: sending a request authentication message to the server by the client.

Step 203: sending, by the server, a response authentication message including a server certificate to the client based on the received request authentication message.

Specifically, the server certificate includes a public key of the server which may be used to digitally sign or encrypt data.

The server certificate is issued by a trusted authority authentication center of a third party, and relies on a Public Key Infrastructure (PKI) technology to bundle a public key of a user and other identification information of the user (such as a name, an E-mail, an ID number, etc.) together to digitally sign or encrypt data with the public key, so as to improve network security.

The PKI is a universal security infrastructure, which is realized by using an asymmetric cryptographic algorithm principle and technology and provides a security service, and the PKI is a basic platform that conforms a standard and provides a complete set of security for performance of on-line e-commerce and e-government by using a public key encryption technology. A PKI-based technology is an infrastructure which provides network information security services based on a public key theory and a technology. A PKI management platform may provide essential key and certificate management for all users who need cryptographic services such as encryption and digital signature. A user may use the security services provided by the PKI platform for secure communication.

Step 204: acquiring, by the client, a local random number in a case that the client determines that the public key included in the server certificate is received.

Specifically, firstly, the client receives a response authentication message sent by the server.

The client then acquires a digital certificate included in the response authentication message, and a public key and a server name of the server included in the digital certificate.

Finally, in a case that the client determines that the public key is received, a random number generated locally and randomly is acquired.

Step 205: performing, by the client, a hash operation on the request authentication message and all of the password authentication messages to acquire a hash value.

Specifically, firstly, the client acquires all of the messages intercommunicated between the client and the server, that is, the request authentication message and all of the password authentication messages intercommunicated there between.

Then, the client performs a hash operation on all acquired messages of the intercommunicated messages, to acquire a hash value.

In this way, all of the messages intercommunicated between the client and the server may be bound to acquire the corresponding hash value. Since the hash value acquired each time is determined based on all of the intercommunicated messages, the hash value varies in real time with a variation of the intercommunicated messages, which may prevent an illegal person or entity from performing an replay attack through continuous transmission of a valid message previously transmitted.

Step 206: encrypting, by the client, the acquired random number and the hash value through the public key to acquire an encrypted value.

Step 207: sending the encrypted value to the server by the client.

Step 208: decrypting, by the server, the received encrypted value based on a local private key to acquire a verification random number.

Step 209: returning the verification random number to the client by the server.

Step 210: acquiring, by the client, a result of the security authentication based on a result of comparing a local random number with the received verification random number.

Specifically, firstly, the client acquires the result of comparing the local random number with the received verification random number.

Then, in a case that the client determines that the local random number is the same as the verification random number based on the acquired comparison result, it may be determined that the security authentication is successful; in a case that the client determines that the local random number is different from the verification random number based on the acquired comparison result, it may be determined that the security authentication fails.

In this way, a password authentication may be performed on the client and the server by combining the password with a public key encryption, and then an authentication may be performed again by using the public key encryption, which ensures the correctness of the identities of both communication parties Communication leakage and information tampering in the communication process are avoided, and the network security is improved.

In some embodiments of the present disclosure, by combining the password with the digital signature, and by performing the security authentication by combining the password with the public key encryption, an illegal person or entity cannot perform a further authentication by the digital signature or the public key encryption, even if the illegal person or entity acquired a corresponding password.

Further, by performing the hash operation on all of the messages intercommunicated between the client and the server to acquire the corresponding hash value, the illegal person or entity may be prevented from performing an replay attack through obtaining a valid message previously transmitted since the hash value may be changed in real time with a change in the intercommunicated messages, and thus, the network security is further improved.

Finally, a re-authentication is carried out on a basis of an original password authentication system, which may be compatible with the original password authentication system, without needing to modify the system greatly. A cost of research and development and a usage cost may be reduced, and practicality is increased.

An electronic device in some embodiments of the present disclosure includes: one or more processors and one or more computer-readable media. The one or more computer-readable media store a program for security authentication thereon, wherein various steps of the first embodiment are implemented in a case that the program is executed by the one or more processors.

One or more computer-readable media in some embodiments of the present disclosure store a program for security authentication thereon, wherein when the program is executed by one or more processors, a communication device may execute the above described steps in the first embodiment.

An electronic device in some embodiments of the present disclosure includes: one or more processors and one or more computer-readable media. The one or more computer-readable media store a program for security authentication thereon, wherein various steps of the second embodiment are implemented in a case that the program is executed by the one or more processors.

One or more computer-readable media in some embodiments of the present disclosure store a program for security authentication thereon, wherein when the program is executed by one or more processors, a communication device may execute the above described steps in the second embodiment.

Figure 3:
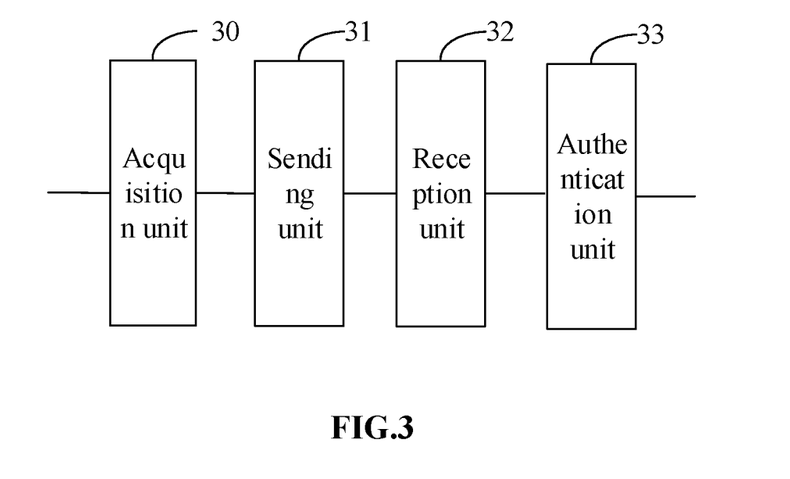
FIG. 3 is a first structural schematic diagram of a security authentication device according to some embodiments of the present disclosure.

According to the above embodiments, referring to the structural schematic diagram of the security authentication device shown in FIG. 3, the security authentication device in some embodiments of the present disclosure specifically includes an acquisition unit 30, a sending unit 31, a reception unit 32 and an authentication unit 33.

The acquisition unit 30 is configured to perform, based on a transmitted password authentication message, password authentication with a server and acquire a result of the password authentication. The sending unit 31 is configured to send a request authentication message to the server in a case that the result of the password authentication is determined to indicate that the password authentication is successful. The reception unit 32 is configured to receive a response authentication message including a server certificate and a digital signature value returned by the server based on the received request authentication message, wherein the server certificate includes a public key of the server, and the digital signature value is acquired based on the request authentication message and the password authentication message. The authentication unit 33 is configured to verify, based on the public key of the server, the digital signature value included in the response authentication message to acquire a result of the security authentication.

Optionally, in a case that the result of the password authentication is determined to indicate that the password authentication is successful and the request authentication message is sent to the server, the sending unit 31 is specifically configured to, in a case that the result of the password authentication is determined to indicate that the password authentication is successful and the request authentication message is sent to the server, trigger the server to perform following steps: performing a hash operation on the password authentication message and the request authentication message to acquire a first hash value; and digitally signing the first hash value based on a local private key to acquire a digital signature value of the request authentication message.

Optionally, in a case that the digital signature value included in the response authentication message is verified based on the public key of the server and the result of the security authentication is acquired, the authentication unit 33 is specifically configured to: perform a hash operation on the password authentication message and the request authentication message to acquire a second hash value; acquire a verification digital signature value by using a preset digital signature verification algorithm based on the public key and the second hash value; acquire the result of the security authentication based on a result of comparing the digital signature value with the verification digital signature value.

Figure 4:
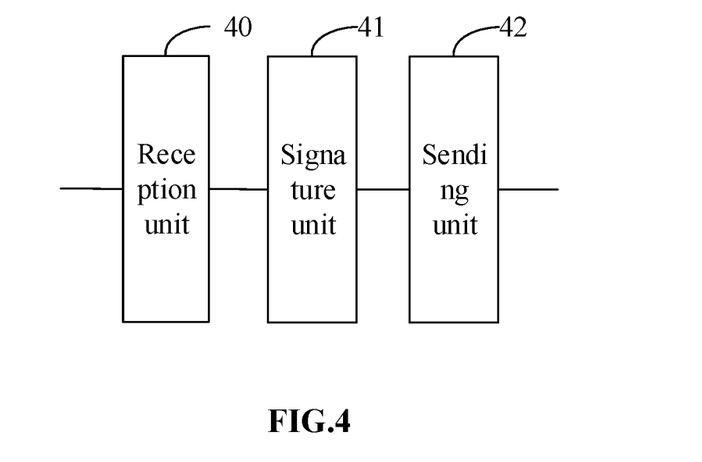
FIG. 4 is a second structural schematic diagram of a security authentication device according to some embodiments of the present disclosure.

According to the above embodiments, referring to the structural schematic diagram of the security authentication device shown in FIG. 4, the security authentication device in some embodiments of the present disclosure specifically includes a reception unit 40, a signature unit 41, and a sending unit 42.

The reception unit 40 is configured to receive a request authentication message sent by the client based on a password authentication result indicating that the password authentication is successful, wherein the result of the password authentication is acquired by performing password authentication based on the transmitted password authentication message. The signature unit 41 is configured to digitally sign the received request authentication message and the password authentication message based on a local private key to acquire a digital signature value. The sending unit 42 is configured to send a response authentication message including a local server certificate and the digital signature value to the client, and trigger the client to verify the digital signature value based on the public key of the server included in a server certificate and acquire the result of security authentication.

Optionally, in a case that the received request authentication message and the password authentication message are digitally signed based on the local private key to acquire the digital signature value, the signature unit 41 is specifically configured to: perform a hash operation on the password authentication message and the request authentication message to acquire a first hash value; digitally sign the first hash value based on the private key to acquire a digital signature value of the request authentication message.

Optionally, in a case that the response authentication message including the local server certificate and the digital signature value is sent to the client and the client is triggered to verify the digital signature value based on the public key of the server included in the server certificate and acquire the result of the security authentication, the sending unit 42 is specifically configured to send the response authentication message including the local server certificate and the digital signature value to the client, and trigger the client to perform the following steps: performing a hash operation on the password authentication message and the request authentication message to acquire a second hash value, and acquiring a verification digital signature value by using a preset digital signature verification algorithm based on the public key and the second hash value, and acquiring a result of security authentication based on a result of comparing the digital signature value with the verification digital signature value.

Figure 5:
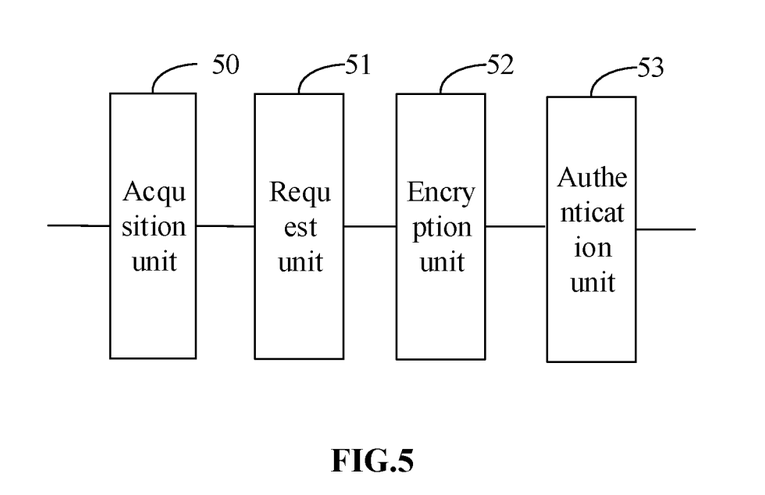
FIG. 5 is a third structural schematic diagram of a security authentication device according to some embodiments of the present disclosure.

According to the above embodiments, referring to the structural schematic diagram of the security authentication device shown in FIG. 5, the security authentication device in some embodiments of the present disclosure specifically includes an acquisition unit 50, a request unit 51, an encryption unit 52, and an authentication unit 53.

The acquisition unit 50 is configured to perform password authentication with the server based on a transmitted password authentication message; and acquire a result of the password authentication. The request unit 51 is configured to send a request authentication message to the server in a case that the result of the password authentication is determined to indicate that the password authentication is successful, and receive a response authentication message including a server certificate returned by the server based on the request authentication message, wherein the server certificate includes a public key of the server.

The encryption unit 52 is configured to encrypt a locally acquired random number, the password authentication message, and the request authentication message based on the received public key of the server, acquire an encrypted value, and send the encrypted value to the server. The authentication unit 53 is configured to receive a verification random number returned based on the encrypted value by the server, and acquire a result of security authentication based on a result of comparing the random number and the verification random number, wherein the verification random number is acquired by decrypting the encrypted value using a private key.

Optionally, in a case that the locally acquired random number, the password authentication message and the request authentication message are encrypted based on the received public key of the server and the encrypted value is acquired, the encryption unit 52 is specifically configured to: acquire a random number generated locally, in a case that the public key is determined to be included in the received response authentication message; perform a hash operation on the password authentication message and the request authentication message to acquire a hash value; encrypting the random number and the hash value based on the public key to acquire the encrypted value.

Figure 6:
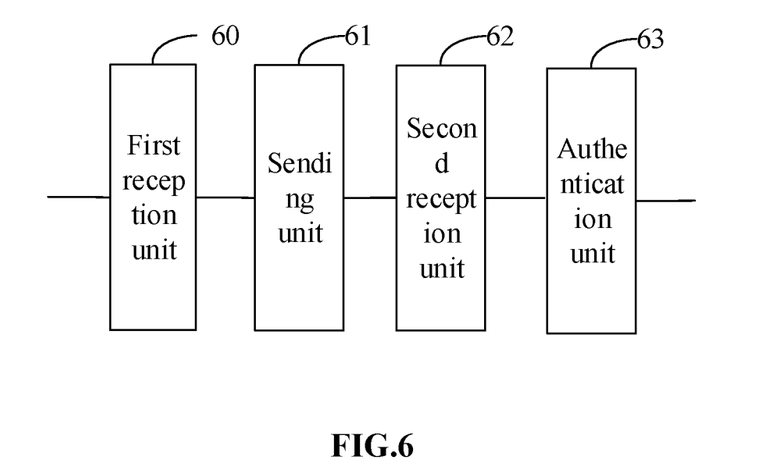
FIG. 6 is a fourth structural schematic diagram of a security authentication device according to some embodiments of the present disclosure.

According to the above embodiments, referring to the structural schematic diagram of the security authentication device shown in FIG. 6, the security authentication device in some embodiments of the present disclosure specifically includes a first reception unit 60, a sending unit 61, a second reception unit 62, and an authentication unit 63.

The first reception unit 60 is configured to receive a request authentication message sent by the client based on a result of password authentication indicating that the password authentication is successful, wherein the result of the password authentication is obtained by performing the password authentication based on a transmitted password authentication message.

The sending unit 61 is configured to send a response authentication message including a local server certificate to the client based on the request authentication message.

The second reception unit 62 is configured to receive an encrypted value sent by the client based on the response authentication message, wherein the encrypted value is acquired by encrypting a locally acquired random number, the password authentication message, and the request authentication message based on the public key of the server included in the server certificate.

The authentication unit 63 is configured to decrypt the encrypted value based on a local private key, acquire a verification random number, send the verification random number to the client, and trigger the client to acquire the result of security authentication based on a result of comparing the random number and the verification random number.

Optionally, in a case that the response authentication message including the local server certificate is sent to the client based on the request authentication message, the sending unit 61 is specifically configured to send the response authentication message including the local server certificate to the client based on the request authentication message, and trigger the client to perform following steps: performing a hash operation on the password authentication message and the request authentication message to acquire a hash value, and encrypting the locally generated random number and the hash value based on the public key to acquire the encrypted value.

In some embodiments of the present disclosure, the password authentication is performed with the server firstly, and then all of the intercommunicated messages are digitally signed by the server, and the client authenticates the digital signature; or the client performs an encryption on the local random number and all of the intercommunicated messages by using a public key, and performs the security authentication by verifying the random number returned by the server, so that the password authentication may be combined with the digital signature, or the password authentication may be combined with the encryption using the public key, the correctness of identities of both communication parties may be ensured, network attacks such as a message leakage and malicious information tampering during communication may be prevented, the reliability of network authentication may be increased, and communication security of a user may be protected.

Those skilled in the art will appreciate that some embodiments of the present disclosure may be provided as methods, systems, or computer program products. Hence, some embodiments of the present disclosure may take the form of full-hardware-based embodiments, a full-software-based embodiment, or embodiments that combine software and hardware aspects. In addition, some embodiments of the present disclosure may employ forms of computer program products implemented on one or more computer usable storage media (including, but not limit to, a disk storage, a CD-ROM, an optical storage, etc.) including computer usable program codes.

Some embodiments of the present disclosure are described by referring to flowcharts and/or block diagrams of methods, devices (systems), and computer program products according to some embodiments of the present disclosure. It should be understood that each flow and/or block in a flowchart and/or a block diagram, as well as a combination of the flow and/or the blocks in the flowchart and/or the block diagram, may be implemented by computer program instructions. These computer program instructions may be provided to a processor of a general purpose computer, a special purpose computer, an embedded processor, or other programmable data processing device to generate a machine, such that when a computer or another programmable data processing device processes instructions, the computer or the another programmable data processing device generates means for implementing functions specified in one or more flows in the flowcharts and/or one or more blocks of the block diagrams.

These computer program instructions may also be stored in a computer-readable storage capable of directing a computer or another programmable data processing device to operate in a particular manner, such that instructions stored in the computer-readable storage generate an article of manufacture that includes a command device, and the command device implements the functions specified in one or more flows of the flowcharts and/or one or more blocks of the block diagrams.

These computer program instructions may also be loaded onto a computer or another programmable data processing device, such that a series of operational steps are performed by the computer or another programmable device to produce a computer-implemented process, and instructions executed on the computer or the another programmable device provide steps for implementing functions specified in one or more flows of the flowcharts and/or one or more blocks of the block diagrams.

Although some embodiments of the present disclosure have been described, additional changes and modifications may be made to these embodiments once those skilled in the art have learned basic inventive concepts. Therefore, the appended claims are intended to be construed as including optional embodiments and all changes and modifications that fall within the scope of some embodiments of the present disclosure.

It will be apparent to those skilled in the art that various modifications and variations may be made in some embodiments of the present disclosure without departing from the spirit and the scope of some embodiments of the present disclosure. Thus, provided that these modifications and variations of some embodiments of the present disclosure fall within the scope of the claims and their equivalents in some embodiments of the present disclosure, it is intended that these modifications and variations be included in some embodiments of the present disclosure.

What is claimed is:

1. A security authentication method performed by a client, the method being used to provide verification of a server, the method comprising:
   performing password authentication with the server based on a transmitted password authentication message to acquire a result of the password authentication;
   sending a request authentication message to the server in a case that the result of the password authentication is determined to indicate that the password authentication is successful, and receiving a response authentication message comprising a server certificate returned based on the request authentication message by the server, wherein the server certificate comprises a public key of the server;
   generating a random number, performing a hash operation on the password authentication message and the request authentication message to acquire a hash value, encrypting the random number and the hash value by using the public key of the server to acquire an encrypted value, and sending the encrypted value to the server;
   wherein generating the random number, performing the hash operation on the password authentication message and the request authentication message to acquire the hash value, encrypting the random number and the hash value by using the public key of the server to acquire the encrypted value, comprises:
   acquiring the generated random number in a case that the received response authentication message is determined to comprise the public key,
   performing the hash operation on the password authentication message and the request authentication message to acquire the hash value,
   encrypting the random number and the hash value based on the public key to acquire the encrypted value;
   receiving a verification random number by the server, wherein the verification random number is acquired by decrypting the encrypted value using a private key, and acquiring a result of security authentication based on a result of comparing the random number with the verification random number to ensure correctness of an identity of the server and an identity of the client, and enable secure communication between the client and the server as a result of successful security authentication.

2. A security authentication method performed by a server, the method being used to provide verification of the server, the method comprising:
   receiving a request authentication message sent by a client based on a result of password authentication indicating that the password authentication is successful, wherein the result of the password authentication is acquired by performing the password authentication based on a transmitted password authentication message;
   sending a response authentication message comprising a server certificate to the client based on the request authentication message;
   receiving an encrypted value sent based on the response authentication message by the client, wherein the encrypted value is acquired by generating a random number, performing a hash operation on the password authentication message and the request authentication message to acquire a hash value, and encrypting the random number and the hash value by using a public key of the server to acquire the encrypted value at the client;
   wherein sending the response authentication message comprising the server certificate to the client based on the request authentication message, specifically comprises:
   sending the response authentication message comprising the server certificate to the client based on the request authentication message, to trigger the client to perform following steps:
   generating a random number,
   performing the hash operation on the password authentication message and the request authentication message to acquire the hash value, and
   encrypting the generated random number and the hash value based on the public key to acquire the encrypted value;
   decrypting the encrypted value based on a private key to acquire a verification random number, sending the verification random number to the client, to trigger the client to acquire a result of security authentication based on a result of comparing the random number with the verification random number to ensure correctness of an identity of the server and an identity of the client, and enable secure communication between the client and the server as a result of successful security authentication.

3. An electronic device, comprising:
one or more processors, and
one or more computer readable media having stored a program for security authentication thereon, wherein when the program is executed by the one or more processors, the one or more processors implement a security authentication method, the security authentication method being used to provide verification of a server, the security authentication method comprises:
performing password authentication with a server based on a transmitted password authentication message to acquire a result of the password authentication;
sending a request authentication message to the server in a case that the result of the password authentication is determined to indicate that the password authentication is successful, and receiving a response authentication message comprising a server certificate returned based on the request authentication message by the server, wherein the server certificate comprises a public key of the server;
generating a random number, performing a hash operation on the password authentication message and the request authentication message to acquire a hash value, encrypting the random number and the hash value by using the public key of the server to acquire an encrypted value, and sending the encrypted value to the server;
wherein generating a random number, performing a hash operation on the password authentication message and the request authentication message to acquire a hash value, encrypting the random number and the hash value by using the public key of the server to acquire an encrypted value, comprises:
acquiring a generated random number in a case that the received response authentication message is determined to comprise the public key;
performing the hash operation on the password authentication message and the request authentication message to acquire the hash value;
encrypting the random number and the hash value based on the public key to acquire the encrypted value;
receiving a verification random number returned based on the encrypted value by the server, and acquiring a result of security authentication based on a result of comparing the random number with the verification random number,
wherein the verification random number is acquired by decrypting the encrypted value using a private key to ensure correctness of an identity of the server and an identity of the client, and enable secure communication between the client and the server as a result of successful security authentication.

4. An electronic device, comprising:
one or more processors, and
one or more computer readable media having stored a program for security authentication thereon, wherein when the program is executed by the one or more processors, the one or more processors implement a security authentication method, the security authentication method being used to provide verification of a server, the security authentication method comprises:
receiving a request authentication message sent by a client based on a result of password authentication indicating that the password authentication is successful, wherein the result of the password authentication is acquired by performing the password authentication based on a transmitted password authentication message;
sending a response authentication message comprising a server certificate to the client based on the request authentication message;
receiving an encrypted value sent based on the response authentication message by the client, wherein the encrypted value is acquired by generating a random number, performing a hash operation on the password authentication message and the request authentication message to acquire a hash value, and encrypting the random number and the hash value by using a public key of the server to acquire the encrypted value at the client;
wherein sending the response authentication message comprising the server certificate to the client based on the request authentication message, specifically comprises:
sending the response authentication message comprising the server certificate to the client based on the request authentication message, to trigger the client to perform following steps:
generating a random number,
performing the hash operation on the password authentication message and the request authentication message to acquire the hash value, and
encrypting the generated random number and the hash value based on the public key to acquire the encrypted value;
decrypting the encrypted value based on a private key to acquire a verification random number, sending the verification random number to the client, to trigger the client to acquire a result of security authentication based on a result of comparing the random number with the verification random number to ensure correctness of an identity of the server and an identity of the client, and enable secure communication between the client and the server as a result of successful security authentication.

\* \* \* \* \*